US005491626A

United States Patent [19]
Williams et al.

[11] Patent Number: 5,491,626
[45] Date of Patent: Feb. 13, 1996

[54] METHOD AND APPARATUS FOR PROFILE TRANSPOSITION TO CALENDAR EVENTS

[75] Inventors: Marvin L. Williams, Lewisville; Abdorelza Salahshour, Keller, both of Tex.

[73] Assignee: International Business Machines Corporation, Armonk, N.Y.

[21] Appl. No.: 78,668

[22] Filed: Jun. 16, 1993

[51] Int. Cl.$^6$ ................................. G06F 17/60
[52] U.S. Cl. ..................... 364/401; 395/159; 395/161
[58] Field of Search ................. 395/600, 425, 395/161, 159, 145–149; 364/705.08, 401, 407

[56] References Cited

U.S. PATENT DOCUMENTS

| | | | |
|---|---|---|---|
| 4,626,836 | 12/1986 | Curtis et al. | 340/706 |
| 4,807,155 | 2/1989 | Cree et al. | 395/161 |
| 5,070,470 | 12/1991 | Scully et al. | 364/705.08 |
| 5,111,391 | 5/1992 | Fields et al. | 364/401 |
| 5,115,501 | 5/1992 | Kerr | 395/600 |
| 5,124,912 | 6/1992 | Hotaling et al. | 364/401 |
| 5,197,000 | 3/1993 | Vincent | 364/401 |
| 5,303,145 | 4/1994 | Griffin et al. | 364/401 |
| 5,323,314 | 6/1994 | Baker et al. | 364/401 |

*Primary Examiner*—Paul V. Kulik
*Attorney, Agent, or Firm*—A. Bruce Clay

[57] ABSTRACT

Predefined and recurring facility attributes are stored and associated with a graphical object/icon on a computer system. When an event is to be scheduled and the facility requirements match one of the icons previously created, the icon, may be dropped onto an on-line scheduler program. The scheduler will then search all available facilities to obtain a results list containing those facilities that match the required attributes.

2 Claims, 4 Drawing Sheets

5,491,626

METHOD AND APPARATUS FOR PROFILE TRANSPOSITION TO CALENDAR EVENTS

TECHNICAL FIELD OF THE INVENTION

This invention relates in general to computer software, and in particular to a method and apparatus for allowing the selection and scheduling of facilities based on a predefined profile of required attributes.

BACKGROUND OF THE INVENTION

With the advent of electronic calendars on computer systems, users of the calendar may assign a multitude of attributes to an event scheduled thereon. For example, if an event is a meeting or a class, it is possible to include attributes/information such as the identity of attendees, duration of the meeting or class, number of seats required, whether a projector or overhead is needed, and etc. As an event becomes more complicated in terms of resources and equipment, additional attributes may be created and added.

Also, there are scheduling programs (scheduler) that can be used in conjunction with a calendar. For example, a scheduler can be used to search for a vacant classroom or meeting room (facility). The search results typically present a user with a listing of alternative openings (i.e., time slots) for each facility searched. If there are required attributes for the facility, such attributes may be used in the search to ensure the facility available meets those requirements.

However, the calendar user must specify attributes individually for each calendar event. In many cases, a user may find that the attributes relating to the event's facility (i.e., classroom or meeting room) for a new event are identical to those required by a previous calendar event. Presently, there is no simple way to allow a user to replicate the same facility attributes for different events. For example, a user may need a slide projector, speaker phone, and seating for eight for multiple but different meetings. The user must manually respecify these attributes for each of the meetings, which may be both time-consuming and tedious, before initiating a search on a scheduling program. Thus, there is a need for a mechanism by which the same attributes may be saved and assigned to multiple meetings/classes.

SUMMARY OF THE INVENTION

The present invention provides a profile transposition of required facility attributes to a calendar which substantially reduces problems with prior event scheduling. The present invention allows use of recurring facility requirements to be used without the need to enter such requirements separately each time.

In accordance with one aspect of the present invention, a method is provided to schedule an event on a computer system when the event has required facility attributes. The attributes are stored on the computer system and associated with a graphical object. The graphical object may then be dragged and dropped onto an event scheduler for appropriate searching of facilities that match the required attributes.

It is a technical advantage of the present invention that manual reentry of facility attributes are no longer required. Whenever a previously stored facility requirement is needed for a new event, a user need only drag and drop the associated icon to a scheduler to initiate an appropriate search.

BRIEF DESCRIPTION OF THE DRAWINGS

For a more complete understanding of the present invention and the advantages thereof, reference is now made to the Detailed Description taken in conjunction with the attached Drawings, in which.

DETAILED DESCRIPTION OF THE INVENTION

Figure 1:
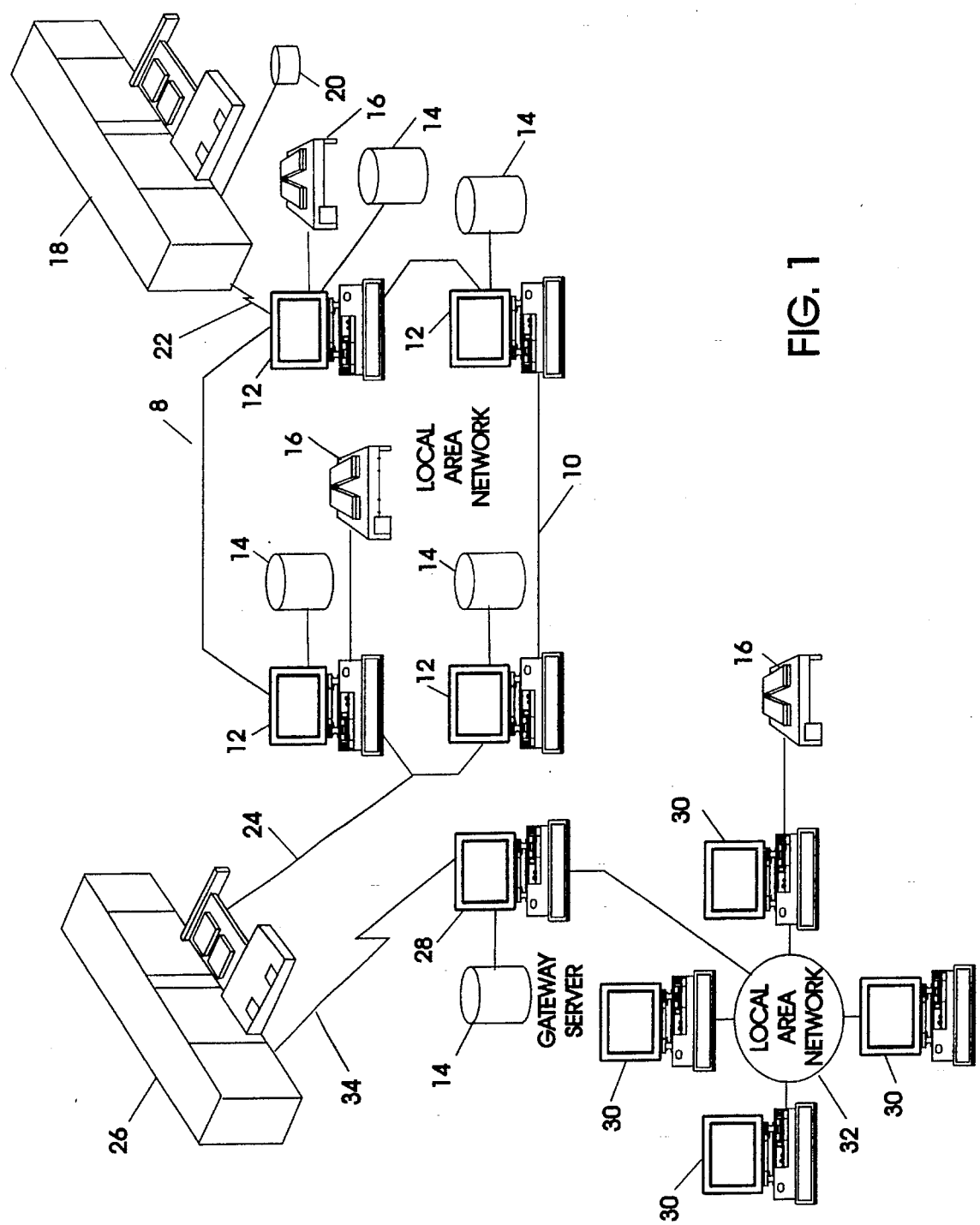
FIG. 1 is a schematic illustration of a data processing system which may be used in accordance with the present invention.

Referring to FIG. 1, there is a depicted a graphical representation of a data processing system 8, which may be utilized to implement the present invention. As may be seen, the data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Workstations (IWS) coupled to a host processor may be utilized for each such network. As is common in such data processing systems, each individual computer may be coupled to a storage device 14 and/or a printer/output device 16.

The data processing system 8 may also include multiple mainframe computers, such as mainframe computer 18, which may be preferably coupled to LAN 10 by means of communications link 22. Mainframe computer 18 may also be coupled to a storage device 20 which may serve as remote storage for LAN 10. Similarly, LAN 10 may be coupled via communications link 24 through a subsystem control unit/ communications controller 26 and communications link 34 to a gateway server 28. Gateway server 28 is preferably an individual computer or IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and, similarly, LAN 10 may be located a substantial distance from LAN 32. For example, LAN 32 may be located in California, while LAN 10 may be located within Texas, and mainframe computer 18 may be located in New York.

Figure 2:
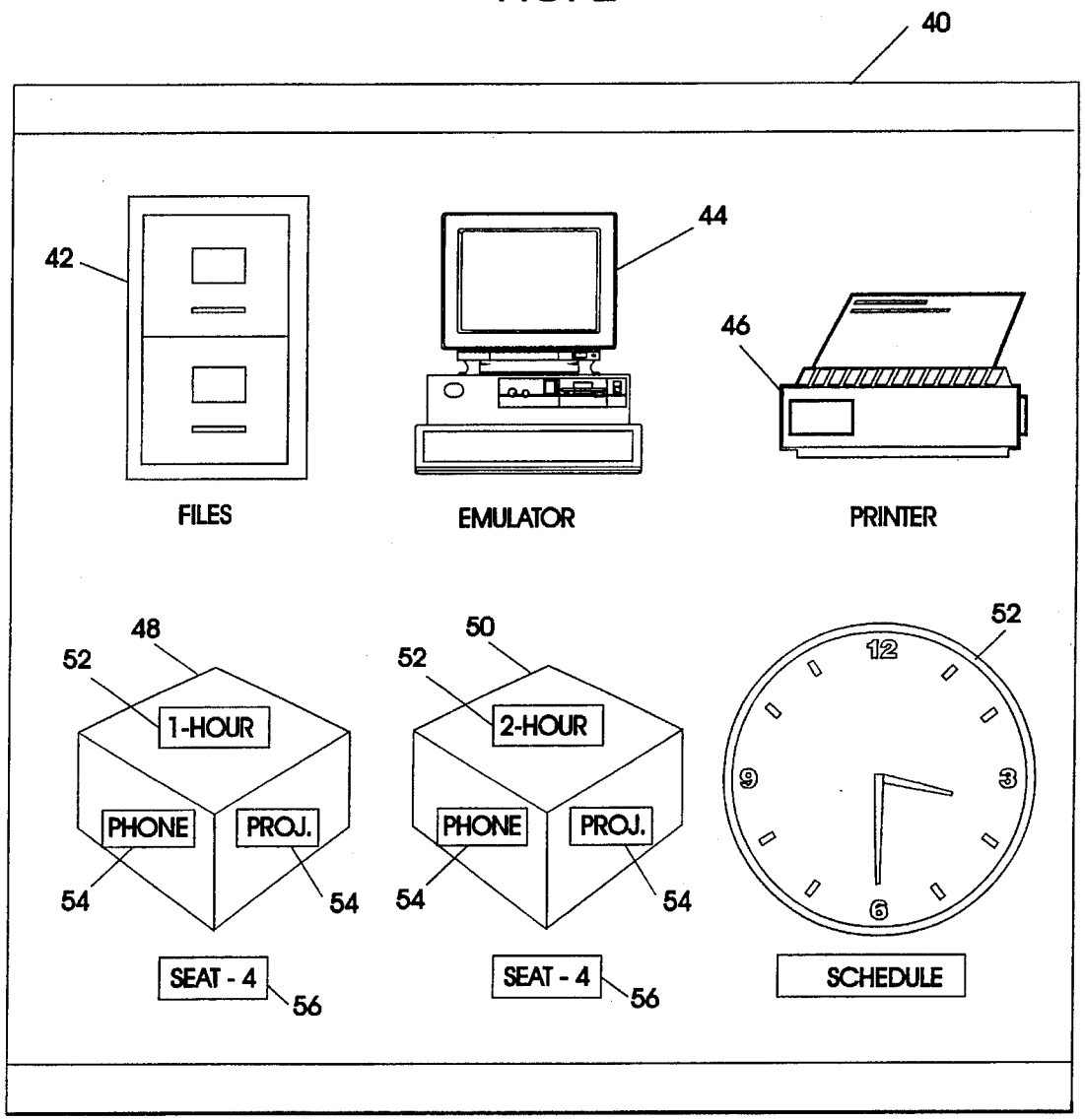
FIG. 2 illustrates a possible graphical representation of the present invention.

Referring to FIG. 2, a possible graphical representation embodying the present invention is illustrated. A computer screen 40, such as may be seen on one of the individual computers 12 or 30 (see FIG. 1), has a plurality of graphical objects (icons). The graphical objects may comprise, for example only, a file icon 42, an emulator icon 44, a printer icon 46, an attribute icon 48, an attribute icon 50, and a schedule icon 52. The icons 42, 44, and 46 are known in the art and will not be discussed herein.

As can be seen, the attribute icons 48 and 50 contain a plurality of facility and scheduling information which a user may want to retain for possible recurring use in scheduling a class or a meeting. As used herein, a facility attribute is meant to define any required information to define an event and may include, for example, a distribution list, a number of attendees, a date/time, a list of supplies/hardware, and etc. For example, each icon 48 and 50 could contain a length of time indicator 52, supplies/hardware indicators 54, and a size/number of participants indicator 56. Obviously, there can be more indicators added to the icons 48 and 50 as required. In implementation, whenever a user requires the scheduling of a classroom/meeting room, if the facility needed meets the requirements stored in the icons 48 and 50, the user may drag and drop the appropriate icon 48 or 50 onto the schedule icon 52. A scheduling program, as indicated by the icon 52, will then conduct the appropriate searching to locate a classroom/meeting room which meets the requirements of the appropriate attribute icon 48 or 50 and present to the user a results list. The user may then select from the results list the preferred choice and the meeting/class will be scheduled.

Figure 3:
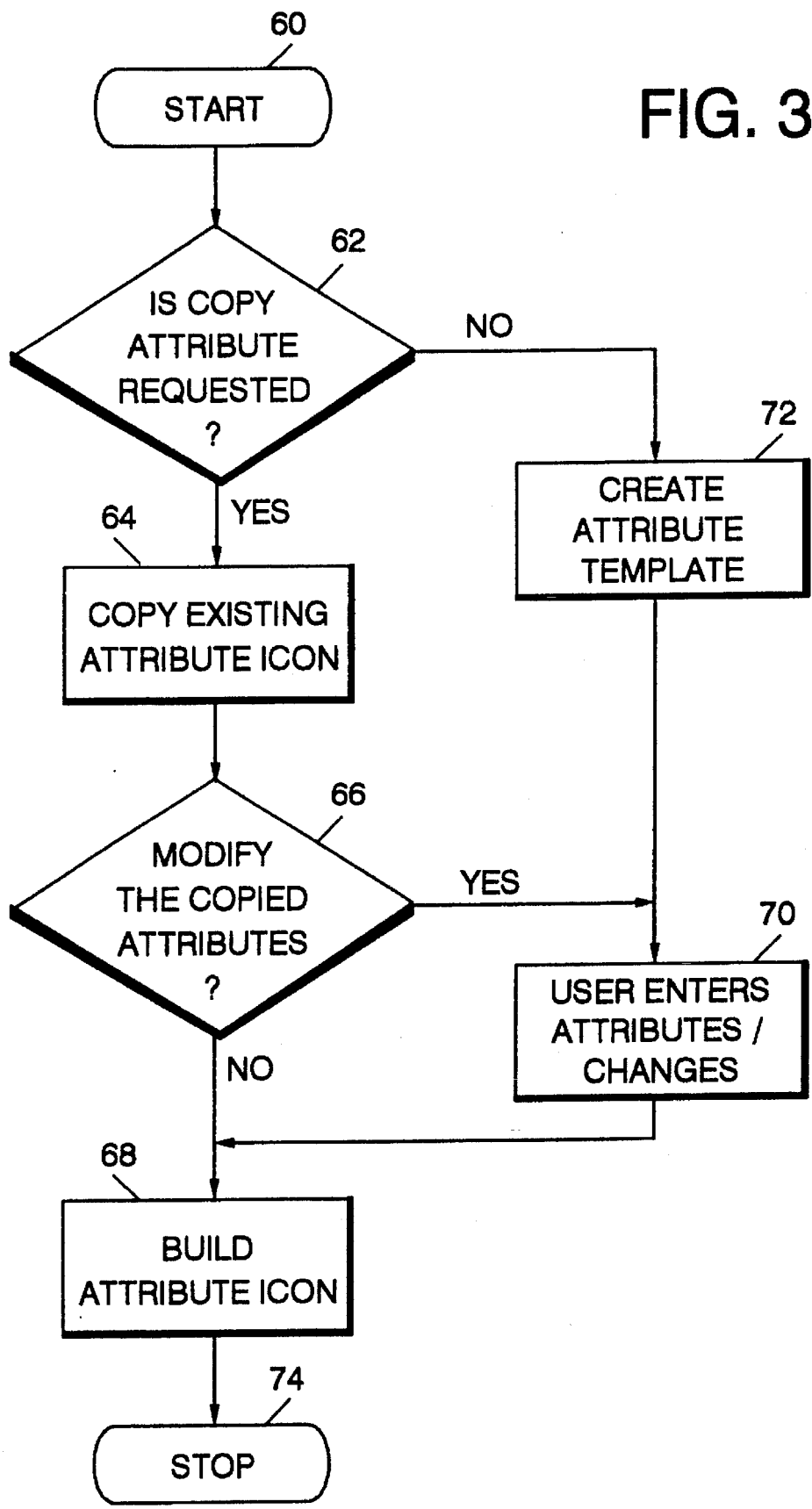
FIG. 3 is a flowchart illustrating construction of a graphical representation for use in accordance with the present invention.

Referring to FIG. 3, a flowchart illustrates the building of an attribute icon in accordance with the present invention. The present invention starts at 60, and it is determined at decision block 62 whether or not there is a request to copy a meeting/class attribute. If the response to decision block 62 is yes, the existing attribute icon is copied at block 64. It is then determined at decision block 66 whether or not the attributes copied are to be modified. If the response to decision block 66 is no, the new attribute icon is built at block 68 (i.e., the attributes are stored with a graphical representation thereof). If the response to decision block 66 is yes, the user enters the attributes/changes at block 70 followed by a building of the attribute icon at block 68, as previously described above. The flow from blocks 62 to 64 to 66 to 68/70 is used whenever the user wants to change attributes for a preexisting attribute icon.

Referring again to decision block 62, if the response thereto is no, an attribute template is utilized for building an attribute icon at block 72. The template is used for presenting attribute fields and/or default attributes for use with the attribute icon. As previously discussed above, the user then enters the appropriate attributes (or elects to accept default attributes) at block 70 followed by a building of the attribute icon at block 68. The present invention then stops at 74.

Figure 4:
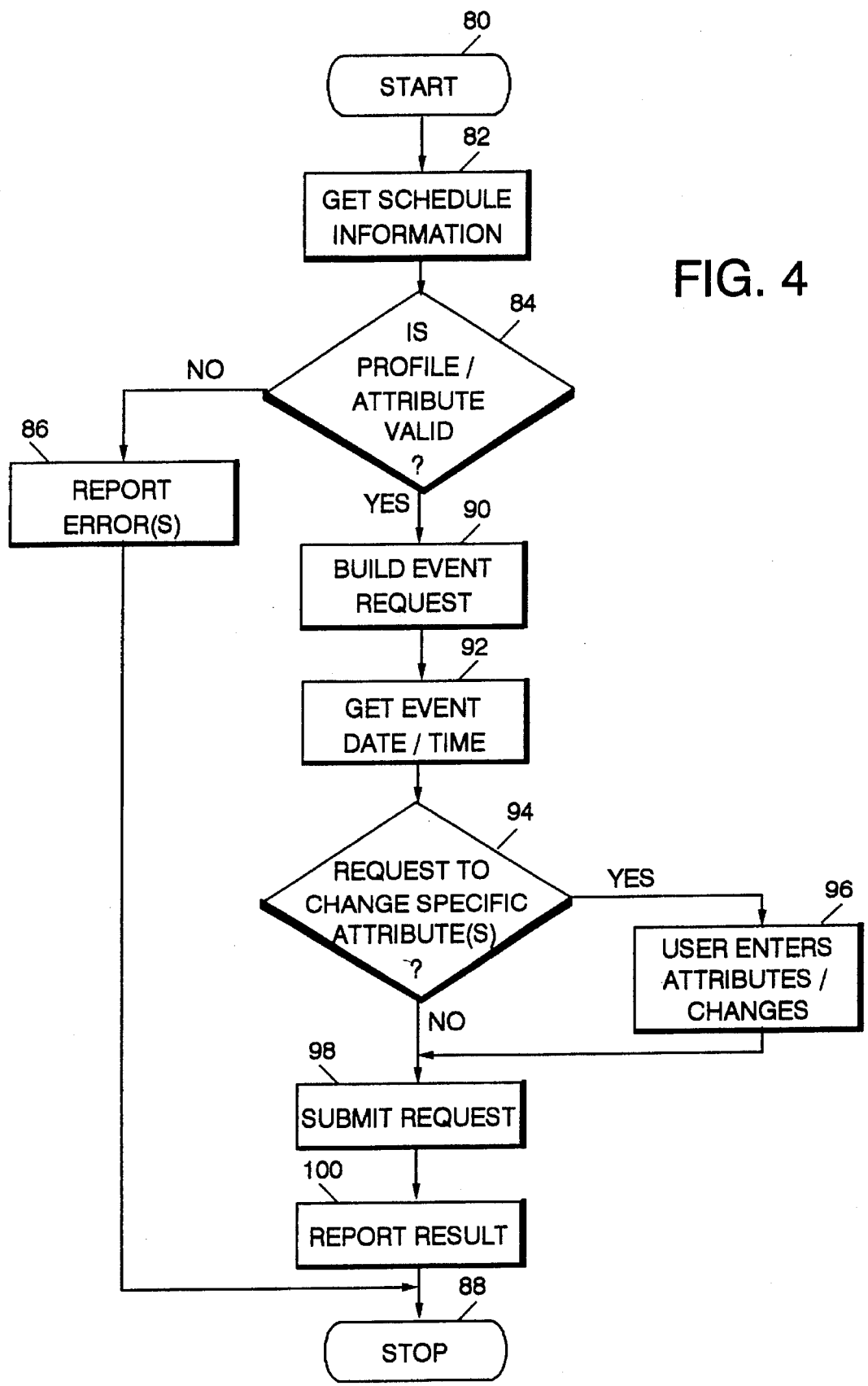
FIG. 4 is a flowchart illustrating use of the present invention.

Referring to FIG. 4, a flowchart illustrates the scheduling of an event in accordance with the present invention. The invention starts at 80 followed by obtaining scheduling information from the previously created attribute template at block 82. It is then determined at decision block 84 whether or not there is a valid profile/attributes. If the response to decision block 84 is no, an error(s) report (conveyed to the user via visual or audio feedback) is initiated at block 86 followed by the present invention stopping at 88. If the response to decision block 84 is yes, an event requester (i.e., a query command) is built at block 90. The event date/time is obtained at block 92. It is then determined at decision block 94 whether or not there is a request to change specific attributes of the event. If the response to decision block 94 is yes, the user enters the appropriate attributes/changes at block 96. If the response to decision block 94 is no or after block 96, the request is submitted (i.e., a search of the appropriate facility databases) at block 98 followed by the result being reported at block 100. The present invention then stops at 88, as previously described above.

Thus, by using the present invention in conjunction with a scheduler, a user is able to simplify the scheduling of facilities meeting predefined requirements. By saving facility attributes in an icon, the user may simply drag and drop the icon to a scheduler. As a result, it will no longer be necessary to reenter the same facility requirements for the scheduling of events.

Although the present invention has been particularly shown and described with reference to a preferred embodiment, it will be understood by those skilled in the art that various changes in form and detail may be made without departing from the spirit and the scope of the invention.

We claim:

1. A method of simplifying scheduling of a new event into a facility which requires attributes similar to those selected for a previously scheduled event using a computer system scheduling program, comprising the steps of:

providing a graphical object to represent a non-specific facility on the computer system;

associating at least one recurring and required attribute with said non-specific facility for display with said graphical object; and directly manipulating said graphical object onto a scheduling program on the computer system in order to obtain a listing of available specific facilities matching said at least one recurring and required attribute, wherein a user may select one of said available specific facilities without manually entering facility requirements each time an event is to be scheduled into a facility requiring similar attributes.

2. A computer system, including a scheduling program, for simplifying scheduling of a new event into a facility which requires attributes similar to those selected for a previously scheduled event, comprising:

means for providing a graphical object to represent a non-specific facility on the computer system;

means for associating at least one recurring and required attribute with said non-specific facility for display with said graphical object; and means for directly manipulating said graphical object onto a scheduling program on the computer system in order to obtain a listing of available specific facilities matching said at least one recurring and required attribute, wherein a user may select one of said available specific facilities without manually entering facility requirements each time an event is to be scheduled into a facility requiring similar attributes.

* * * * *